May 9, 1967 S. J. SARNOFF 3,318,021
TRAINING CARTRIDGE
Filed May 5, 1965
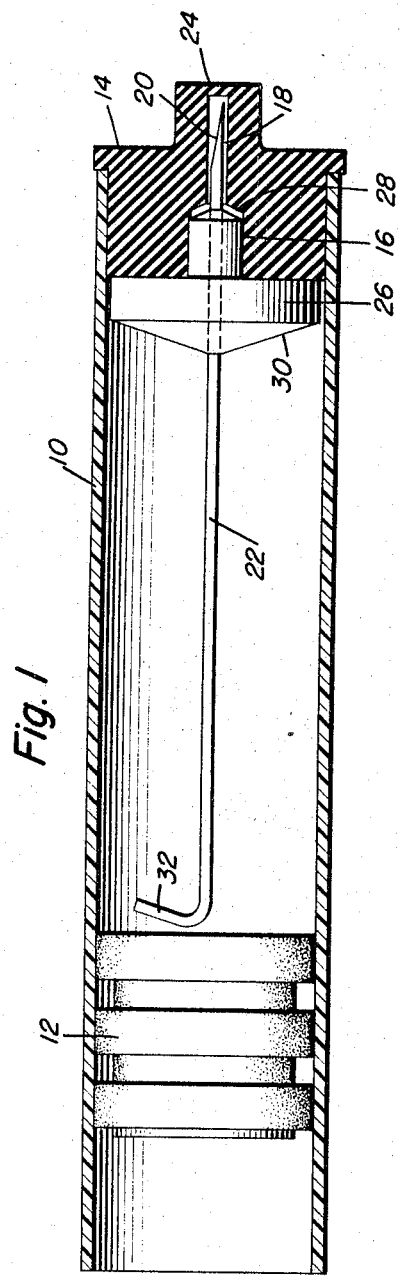
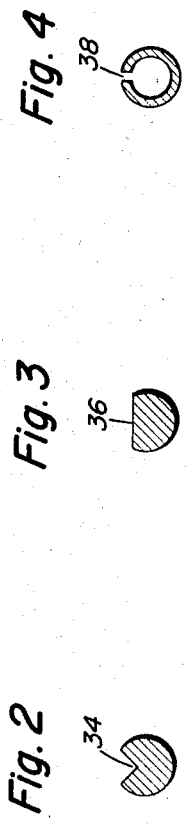
INVENTOR
Stanley J. Sarnoff
BY *Bowyer and Witherspoon*
ATTORNEYS

United States Patent Office 3,318,021
Patented May 9, 1967

3,318,021
TRAINING CARTRIDGE
Stanley J. Sarnoff, 7507 Hampden Lane,
Bethesda, Md. 20014
Filed May 5, 1965, Ser. No. 453,301
7 Claims. (Cl. 35—17)

This invention relates to an educational appliance to train individuals in the administration of medication, such as a liquid medication, either to themselves or others. More particularly the invention relates to a dummy cartridge, the cartridge having a body, preferably sans liquid or medication, the body containing a needle driving plunger, the body also containing an imperforate needle which needle is to be injected.

It can well be appreciated that under many circumstances, such as self-administration or the treating of wounded personnel on a battlefield, the injection of medication via a syringe or the like into a patient is potentially hazardous unless the one administering the medication either to himself or others has been trained in the use of the device he was using.

With the present training device, individuals may be taught how to administer medications to themselves or to others by actually having the needle enter into the tissues of the subject but without actually driving fluids or the like into the tissues. In this manner the individual becomes familiar with the use of the device, would learn to known whether the needle had actually penetrated into the subject, and learn that, essentially, the process can be painless. In this manner the use of a device of the character herein set forth is facilitated under real emergency conditions.

It is therefore an object of this invention to provide a dummy cartridge to enable interested persons to become skilled in the art of injection or self-injection when the cartridge is used in conjunction with an appropriate device.

It is a further object of this invention to so make the dummy cartridge that in the use of the device with which it is to be used, the movements of the trainee will be exactly the same as if medication was actually being administered to a patient or to himself.

Other objects of the invention is to provide a low cost training cartridge, and a training cartridge that will not core.

Still other objects will become apparent after a consideration of the following specification, when taken in conjunction with the accompanying drawings in which:

FIG. 1 is a sectional view of a cartridge which may be employed.

FIGS. 2, 3 and 4 are cross sectional views of alternative constructions of a needle taken anywhere along the intermediate length of the needle and permitting the escape of air from the body of the cartridge during use of the device.

FIG. 5 is a fragmentary portion of a still further alternative construction of a needle, partly in section.

Now considering the drawings in greater detail, in FIG. 1 there is disclosed a cartridge body 10 which may be of transparent plastic material within which at the rear end snugly fits a resilient plunger 12 as of rubber. The material may be of any character since there need not necessarily be medication within the body and therefore be of any cheap material. At the forward end of the cartridge there is provided a resilient stopper 14, as of rubber, tightly fitted within the body. The stopper has an axial enlarged bore 16 therewithin, which if desired may taper down to a smaller bore as indicated at 18, to accommodate the beveled right hand end 20 of needle 22. The outer end of the bore is closed off by a rubber membrane or diaphragm 24, either integral with the stopper, or as a separate member adhered to the stopper. The membrane is easily punctured by the needle, when the needle is thrust to the right, FIG. 1, relative to the body and stopper. The action of the membrane and tight fits of the stopper and plunger serve to maintain the interior of the cartridge body and the needle sterile. Should sterilization be desired, the parts of the cartridge may be sterilized during assembly. The needle 22 may be provided with a needle disc 26 of rigid material, as of plastic material, which may be frictionally secured to a recessed portion 28 of the stopper, the disc being axially perforated to slidably guide the needle in its movement to the exterior of the body member. The left face of the disc as viewed in FIG. 1 is conical as indicated at 30 for a purpose to be described. The disc while shown as an element separate from the stopper may be made unitary therewith. The interior of the body is normally filled with air or other gaseous fluid. The rear end of the needle is bent as indicated at 32 to afford a thrust member against which the plunger may be applied to drive the right hand end of the needle through the stopper and diaphragm or membrane 24. Also the angle of bend of the bent portion is such as to conform to the angle of the conical face of the part 30 so that on withdrawal of the needle, after injection thereof, ample support for the needle is provided so that it will not pull through the disc and the stopper.

The cartridge differs from the prior art in at least two important aspects. First, normally, there is no medication or liquid within the body member. Second, there is no closed canal through the needle to accomplish the transfer of gas from the body member to the pointed end of the needle.

While there is no medication within the body member, it is necessary to provide means for the transfer of gas from within the body member to the exterior thereof during the movement of the plunger to the front end of the body member.

This may be effected by suitably grooving the needle. In the form of needle shown in FIG. 2, the needle is provided with a V-groove 34 running the length of the needle. This V-groove may merge into the beveled forward end of the needle or may stop just short of the front beveled end. Thus when the plunger 12 is moved forwardly in the body member 10, there will just be a slight compression of the air until the forward face of the plunger engages the bent end of the needle; then a slight displacement of the needle will cause the forward end of the needle to puncture the diaphragm and thereafter the air compressed in the body member is released to the atmosphere via the V-groove. Sometimes, in order that the subject have a sense of reality of the act of injection, a quantity of liquid, as water, may be placed in the body, this liquid being expelled to the outer atmosphere and possibly run down onto the skin or clothing of the subject.

Instead of a V-groove in the needle, the needle may be provided with a flat portion as indicated at 36, this flat position running substantially the entire length of the needle.

Still another form of needle is illustrated in FIG. 4 wherein the needle is made of rolled sheet metal with an open side 38 running substantially the length of the needle so that in cross section the needle presents an incomplete ring. In all of these forms the opening in the side may if desired run close to the end of the needle but not to the beveled end thereof to more closely simulate actual needle injection feel when the needle is inserted into a patient or subject. Or if a sense of reality be desired, the pointed end, only, of the needle may be hollow as indicated at 40 in FIG. 5.

The cartridge is intended for use in an automatic injector housing, for example, in the type of holder shown in the patient to Sarnoff No. 2,704,072 or Sarnoff et al. No. 2,832,339.

The advantages of this type of training device are manifold.

When the device is used, the trainee will go through all the motions of giving an injection whether on himself or on a subject other than himself. Note, no fluid is actually transferred to beneath the skin of the subject and if the subject be himself, he will become educated as to the relative absence of pain and become more likely to effectuate the actual injection of medicament at a later time under circumstances in which a real injection or self-administered injection of medicament is required.

Although sterilization can be effected during assembly, such sterilization may also be effected prior to or after assembly of the cartridge.

Having described the invention, what is claimed is:

1. A training cartridge comprising a body, a plunger at one end of the body, a stopper at the other end of the body, a needle within the cartridge body having one end in position to be engaged by the plunger in its movement axially of the bore, a gaseous fluid filling the space within the body, said needle being devoid of a continuous duct running through the needle, to thereby prevent flow of fluid through the interior of the needle, and means interconnecting the interior of the cartridge body with the outer atmosphere to allow for escape of fluid from within the cartridge body on displacement of the plunger.

2. A training cartridge as set forth in claim 1 in which the means interconnecting the interior of the body with the outer atmosphere includes a V-groove running axially along the exterior of the needle.

3. A training cartridge as set forth in claim 1 in which the means interconnecting the interior of the body with the outer atmosphere includes a flat portion running axially along the exterior of the needle.

4. A training cartridge as set forth in claim 1 in which the means interconnecting the interior of the body with the outer atmosphere includes an open sided channel running axially along the length of the needle, said needle in cross section displaying an incomplete ring.

5. A training cartridge as set forth in claim 1 wherein the other end of the needle is pointed and there is a hollow in the needle at the pointed end of the needle.

6. A training cartridge comprising a body, a plunger at one end of the body, a stopper at the other end of the body, a needle within the cartridge body having one end in position to be engaged by the plunger in its movement axially of the bore, a fluid filling the space within the body, said needle being devoid of a continuous duct running through the needle, to thereby prevent flow of fluid through the interior of the needle, and means interconnecting the interior of the cartridge body with the outer atmosphere to allow for escape of fluid from within the cartridge body on displacement of the plunger.

7. A training cartridge comprising a body, a plunger at one end of the body, a stopper at the other end of the body, a needle within the cartridge body having one end in position to be engaged by the plunger in its movement axially of the bore a fluid filling the space within the body, said needle being devoid of a continuous duct running through the needle, to thereby prevent flow of fluid through the interior of the needle, and means interconnecting the interior of the cartridge body with the outer atmosphere to allow for escape of fluid from within the cartridge body on displacement of the plunger, a disc within the body juxtaposed to said stopper, said disc having a conical end face within the body and said needle having a bent end within the body conforming in angularity to the angle of the conical end face of the disc.

References Cited by the Examiner

UNITED STATES PATENTS 2,489,600 11/1949 Tydings et al. _____ 128—218
2,689,415 9/1954 Haver _____ 35—17

EUGENE R. CAPOZIO, *Primary Examiner.*

H. F. ROSS, H. S. SKOGQUIST, *Assistant Examiners.*